S. P. FRANCISCO.
Churn.

No. 6,544.

Patented June 19, 1849.

UNITED STATES PATENT OFFICE.

SAML. P. FRANCISCO, OF READING, PENNSYLVANIA.

ATMOSPHERIC CHURN.

Specification of Letters Patent No. 6,544, dated June 19, 1849.

*To all whom it may concern:*

Be it known that I, SAMUEL P. FRANCISCO, of Reading, in the county of Berks and State of Pennsylvania, have invented certain new and useful Improvements in Churns, of which the following is a full, clear, and exact description, reference being had to the annexed drawings of the same, making part of this specification, in which—

Figure 1:
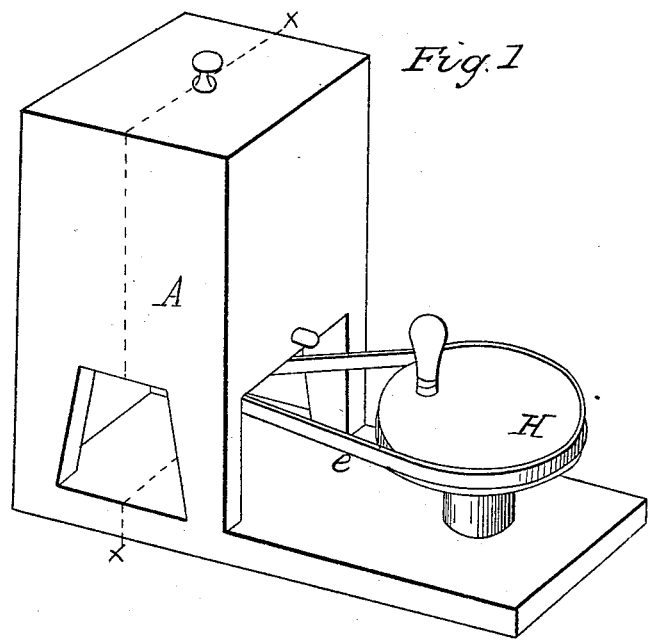
Figure 2:
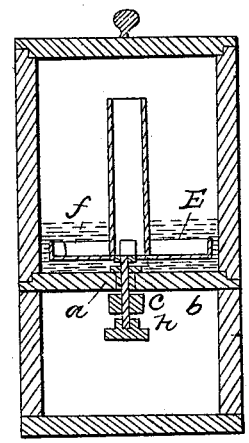
Figure 3:
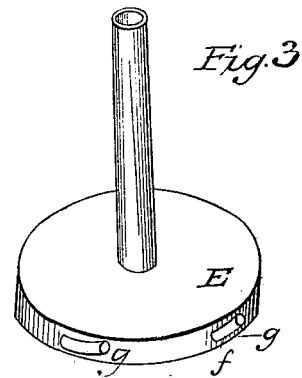

Figure 1 is a perspective view of the exterior of the machine. Fig. 2 is a vertical section, taken through the line $x$ $x$ of Fig. 1. Fig. 3 is a perspective view of the dasher detached from the churn.

My invention and improvement consists in making a wide and shallow churn tub (A) of a round or other convenient form, and arranging therein near to the bottom, a revolving dasher, consisting of a disk, E surmounted by a tubular stem extending to the top of the tub, and open at its upper end. This disk is nearly as large in diameter as the interior of the tub and is perforated with radial tubular channels $f$ from its periphery to its center communicating with the interior of the stem; when the dasher is in operation the air passes down the stem and through these channels into the cream, the sides $g$ of the channels which go forward, project beyond the opposite sides which follow and when the dasher is rapidly rotated a partial vacuum is formed in the cream behind the projecting side of the channel into which the air rushes, and mingles with the cream. If the dasher were made double and hollow and provided with suitable outlets and adjutages for the air, it would answer just as well if the same external form were preserved. The dasher is mounted on a spindle $b$ passing through and projecting below the bottom of the tub, and turning in a water tight bearing, the lower extremity of the spindle turning in a step secured to the stirrup $h$. A pulley $c$ is secured to the spindle to turn it, and receives motion from a band driven by the hand wheel H.

This dasher being comparatively smooth and regular in its form without any bold projection beyond the planes and circles of its motion would not directly agitate the cream with sufficient violence, but when in rapid motion its broad surface drives the cream which only rises two or three inches above it against the sides of the tub where it accumulates immediately above where the air is discharged, which in passing up through it gives it such a thorough agitation as rapidly separates the butter which first appears in minute particles disseminated throughout the mass of the cream. At this point of the process, the motion of the dasher, before rapid, is reduced and moved around very slowly and gently, and the particles of the butter by abrasion upon its upper surface are brought into contact with, and cohere to each other, forming large balls or rolls. This aggregation of these fine particles of butter is effected in a very short space of time, as the larger seem to have an attraction for the smaller particles, and their rolling upon the disk expresses the milk from the mass and gives it solidity.

The great comparative width of the churn renders it capable of holding sufficient cream for ordinary purposes when not filled more than two or three inches above the top of the dasher, and it will be perceived that these proportions are important from the fact that if there was a great depth of cream above the top of the dasher, the butter would float so far above it that it could not be forced into balls as above mentioned.

The formation of the butter into large rolls or balls in this manner is not merely a matter of great convenience, but also effects a positive saving of butter, by separating all those fine particles which in the ordinary process pass through the meshes of the strainer into the butter milk and are thus lost.

What I claim as my invention, and desire to secure by Letters Patent, is—

The tubulated disk dasher (E) surmounted by a hollow stem, for churning cream by agitating and by admixing therewith atmospheric air, and the gathering the butter (when separated) into large balls or rolls as herein set forth.

SAMUEL P. FRANCISCO.

Witnesses:
RENWICK,
P. H. WATSON.